N. W. BARKER.
DRAIN AND RELIEF VALVE.
APPLICATION FILED MAY 18, 1916.
1,225,744.
Patented May 15, 1917.
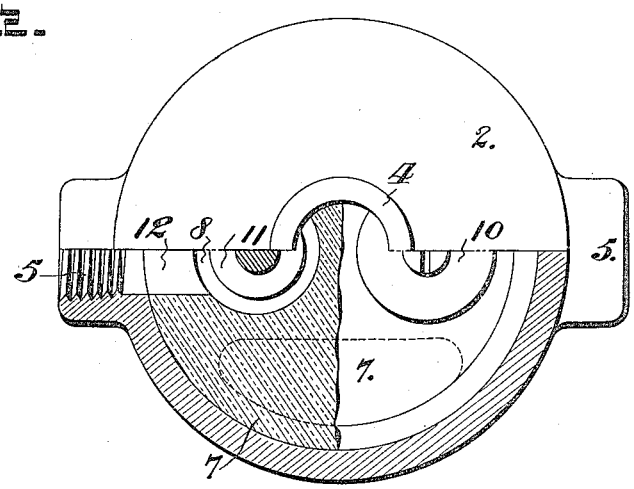
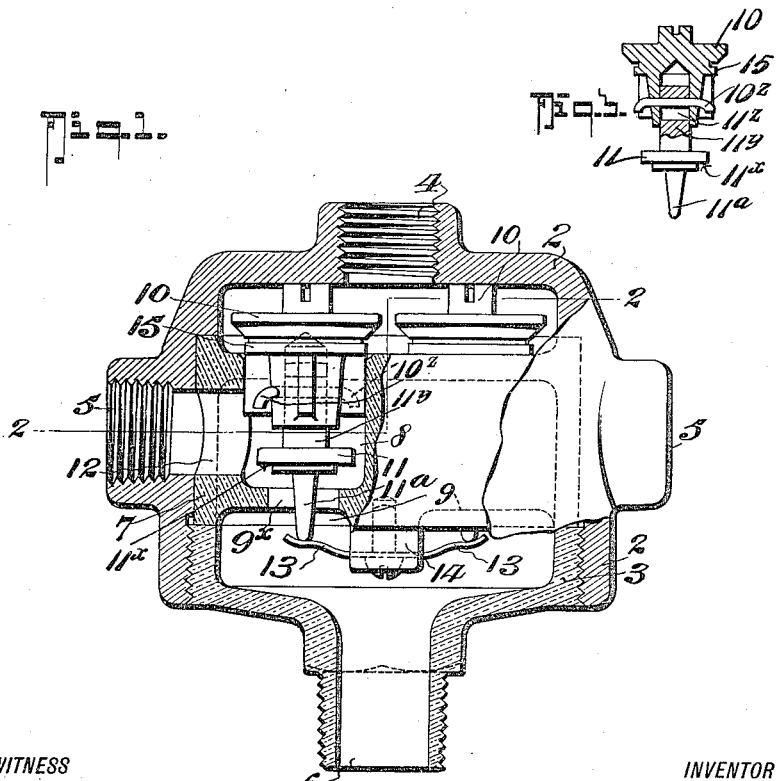
WITNESS
Charles J. Diller.
INVENTOR
N. W. Barker.
BY
Fred G. Dieterich
ATTORNEYS

UNITED STATES PATENT OFFICE.

NOEL WILLIAM BARKER, OF VICTORIA, BRITISH COLUMBIA, CANADA.

DRAIN AND RELIEF VALVE.

1,225,744.  Specification of Letters Patent.  Patented May 15, 1917.

Application filed May 18, 1916. Serial No. 98,370.

*To all whom it may concern:*

Be it known that I, NOEL W. BARKER, a citizen of the Dominion of Canada, residing at Victoria, in the Province of British Columbia, Canada, have invented certain new and useful Improvements in Drain and Relief Valves, of which the following is a specification.

This invention relates to a drain and relief valve for engine cylinders and the like to automatically drain water from the cylinder when the steam is shut off and having also provision to relieve the cylinder from water when the pressure of such exceeds that of the steam pressure under which the engine is working.

It is designed to dispense with the personal element of watchfulness on the part of an engineer in attending to the opening of the drain cocks of the cylinder before starting the engine, and in the relief feature to avoid damage to the engine through the pressure of water in the cylinder, whether through priming from the boiler or otherwise.

The invention is particularly described in the following specification, reference being made to the drawings by which it is accompanied, in which:

Figure 1 is a part elevation and part central vertical section of the invention. Fig. 2 is a sectional plan on the line 2—2 of Fig. 1. Fig. 3 is a detail section of one of the double valves.

In these drawings the casing of the valve is shown as constructed in two parts 2 and 3, the upper 2 having provision at 4 in the upper end for connection to it of a pipe from the steam chest or steam pipe of the engine and opposite one another at 5, 5 provision for connection of the drain pipes from the opposite ends of the cylinder.

In the lower end of this part 2 is removably secured the part 3 having provision at its center at 6 for connection to it of a pipe delivering the drainage water from the cylinders to the atmosphere.

Fitted steam-tight within the body 2 and secured therein by the part 3, which is secured into the lower end, is a body portion 7 having on each side of the center through apertures which are chambered as at 8, 9, each of which apertures is in communication at 12 with one of the drainage connections 5 from the cylinder. The lower end 9 of the aperture is considerably smaller than that portion of it 8 which is in communication with the cylinder drain pipe connection 5. In each aperture 8, 9 the relief and drainage valves 10 and 11 are seated.

The relief valve 10 is winged to fit the aperture 8 and the upper end is conical to seat on the upper edge of the aperture. Below the seat for a depth slightly less than the maximum lift of the valve it slidably fits the aperture 8 at 15, so that the valve is only open as an exit passage when at its maximum lift.

The drainage valve 11 is loosely connected with the valve 10 and has a flat seat $11^x$ to engage the shoulder or web $9^x$ between the chambering 8 and 9. The stem $11^y$ of the valve 11 is socketed and pin-connected into that of the relief valve 10 see Fig. 3, the aperture $11^z$ for the pin $10^z$ in the stem of the drain valve being sufficiently large to permit of limited endwise movement between the two valves, so that although the valves are connected to move together the limited endwise movement permits each to seat irrespective of the other.

The drain valve 11 has a stem projection $11^a$ below its seat on the end of which bears the end of a flat spring 13 recessed into a central projection 14 from the body portion 7. This spring extends across to engage both valves, or, if preferred, a separate coil spring may be provided for each stem.

It will be noted that the space within the casing 2, which is above the relief valves 10, is common to both valves, and being connected to the steam chest or to the pipe delivering steam thereto is under constant steam pressure, while the engine is running, by which pressure both relief and drain valves are held to their seats. Also that the space below the drain valves 11 is common to both valves 11 and is open to the atmosphere, or to the condenser if it is considered desirable to drain thereto, and these valves, both drain and relief, are held open by the spring 13 when there is no steam pressure in the space above the valve 10, that is, when the engine is not running. But while the spaces above the valves 10 and below the valves 11 are common to the two pairs of valves the spaces 8 between each drain and relief valve are separately connected to each end of the cylinder.

With valves so constructed and connected, when steam is admitted to the engine to warm the pipes and cylinders up before starting, both valves 10 and 11 being held open by their spring 13 to their maximum limit the water condensing in the steam pipe or steam chest, and in the cylinders is free to drain therefrom, that from the steam pipe escaping under the cylindrical portion 15 of each valve 10 and through the drain valve 11, and that condensing in the cylinders through the valves 11; but when the engine is started the pressure of steam in the steam chest acting on the upper sides of both the relief valves 10 closes them and the drain valves 11 on their respective seats, and prevents escape of the steam.

If, while the engine is running, there is an accumulation of water in either end of the cylinder from priming from the boiler or otherwise, as soon as the pressure imposed on that water by the piston exceeds the pressure of the steam to an extent that might prove injurious to the engine, that pressure acting on the underside of the relief valve 10, which area is greater than that of the drainage valve 11, the relief valve is lifted and lifts with it the drainage valve 11 and permits escape of the water.

It will be obvious that although the valve is shown and described as for a single cylinder engine, the same external casing may be made to receive another pair of drain and relief valves quartered with what is shown, bosses being provided for the reception of the connections from each end of the other cylinder and the spring of these additional valves crossing the spring 13 at right angles but as this is a mere duplication of the parts illustration is thought to be unnecessary as it will be clearly understood by those skilled in the art.

Having now particularly described my invention, I hereby declare that what I claim as new and desire to be protected in by Letters Patent, is:

1. A water drainage and pressure relief valve for an engine cylinder or the like, said valve comprising a hollow body divided by partitions into three chambers, the upper one of which having provision for connecting it to the steam chest of the engine, the middle chamber having provision for connecting it to the engine cylinder, and the lower chamber being open to the atmosphere, the partitions between the chambers being apertured in alinement, connected valves seating downward in the partition apertures and a spring normally holding the valves open.

2. A water drainage and pressure relief valve of the class described, said valve comprising in combination a hollow body divided into three chambers the upper chamber being connected to the middle one by a circular aperture and the middle one to the lower by a relatively smaller aperture in the same axial alinement, a valve seating in the upper aperture and opening upward, a valve seated in the lower aperture and opening upward, means for connecting the two valves together to allow a limited movement between them, a spring tending to hold both valves open, means for delivering steam from the steam chest into the upper chamber, means for delivering drainage water from the cylinder into the middle chamber, and means for delivering from the lower chamber to the atmosphere.

3. A water drainage and pressure relief valve of the class described, said valve comprising in combination a hollow body divided into three chambers the upper chamber being connected to the middle one by a circular aperture and the middle one to the lower by a relatively smaller aperture in the same axial alinement, a valve seating in the upper aperture and opening upward, a valve seated in the lower aperture and opening upward, the stem of the lower valve being socketed into the upper valve and pin-connected in a manner to permit of limited endwise movement, a spring within the lower chamber tending to hold both valves open, means for delivering steam from the steam chest into the upper chamber, means for delivering drainage water from the cylinder into the middle chamber, and means for delivering from the lower chamber to the atmosphere.

4. A water drainage and pressure relief valve of the class described, said valve comprising in combination a hollow body divided into three chambers the upper chamber being connected to the middle one by a circular aperture and the middle one to the lower by a relatively smaller aperture in the same axial alinement, a winged valve seating in the upper aperture and opening upward, said valve having a conical seat and having a cylindrical portion fitting the aperture and of a depth slightly less than the maximum upward movement of the valve, a valve opening upward and having a flat seat to close the lower aperture the lower valve being socketed and pin-connected to the upper valve, a spring within the lower chamber tending to hold both valves open, means for delivering steam from the steam chest into the upper chamber, means for delivering drainage water from the cylinder into the middle chamber, and means for delivering from the lower chamber to the atmosphere.

5. A water drainage and pressure relief valve of the class described, said valve comprising a hollow casing open at the lower end, a partition body fitted steam-tight within the casing and retained in position by a lower cover screwed in the casing, chambered apertures through the body portion connecting the space above it to the space beneath, connected valves to open upward seated on the upper edge and on the chambered projection of each aperture, a spring tending to hold each pair of valves in the open position, means for delivering steam from the steam chest into the space above the upper valves, means for delivering the drainage water from each cylinder end into the chambered space between each pair of connected valves, and means for delivering from the space beneath the valves to the atmosphere.

6. A water drainage and pressure relief valve for an engine cylinder or the like, said valve comprising a hollow body divided by partitions into three chambers, the upper one of which having provision for connecting it to the steam chest of the engine, the middle chamber having provision for connecting it to the engine cylinder, and the lower chamber being open to the atmosphere, the partitions between the chambers being apertured in alinement, a valve seating downward in each aperture, said valves connected together in a manner permitting limited movement between them, and a spring normally holding the valves in the open position.

7. A water drainage and pressure relief valve for an engine cylinder or the like, said valve comprising a hollow body divided by partitions into three chambers, the upper one of which having provision for connecting it to the steam chest of the engine, the middle chamber having provision for connecting it to the engine cylinder, and the lower chamber being open to the atmosphere, the partitions between the chambers being apertured in alinement, a valve seating downward in each partition aperture, the stem of the lower valve socketing into the body of the upper valve, and pin-connected thereto in a manner permitting limited endwise movement in the socket.

8. A water drainage and pressure relief valve for an engine cylinder or the like, said valve comprising a hollow body divided by partitions into three chambers, the upper one of which having provision for connecting it to the steam chest of the engine, the middle chamber having provision for connecting it to the engine cylinder, and the lower chamber being open to the atmosphere, the partitions between the chambers being apertured in alinement, a conically seated winged valve seating in the upper aperture to open upward, a flat seated valve in the lower aperture opening upward, a connection between the said lower valve and said upper valve, and a spring normally holding both valves in the open position.

In testimony whereof I affix my signature.

NOEL WILLIAM BARKER.

Copies of this patent may be obtained for five cents each, by addressing the "Commissioner of Patents, Washington, D. C."